United States Patent [19]
Lee

[11] Patent Number: 6,076,169
[45] Date of Patent: Jun. 13, 2000

[54] COMPUTER SYSTEM HAVING A SCREEN SAVER WITH A POWER SHUTDOWN FUNCTION AND A CONTROL METHOD THEREOF

[75] Inventor: Yong-Hoon Lee, Suwon, Rep. of Korea

[73] Assignee: Samsung Electronics Co., Ltd., Suwon, Japan

[21] Appl. No.: 09/062,721

[22] Filed: Apr. 20, 1998

[30] Foreign Application Priority Data

Apr. 18, 1997 [KR] Rep. of Korea ................. 97-14559

[51] Int. Cl.[7] ............................................ G06F 1/32
[52] U.S. Cl. ............................................ 713/320
[58] Field of Search .................... 713/320, 323, 713/324, 300

[56] References Cited

U.S. PATENT DOCUMENTS

| 5,059,961 | 10/1991 | Cheng . |
| 5,335,168 | 8/1994 | Walker ................. 713/321 |
| 5,371,693 | 12/1994 | Nakazoe . |
| 5,375,230 | 12/1994 | Fujimori ............... 713/323 |
| 5,457,516 | 10/1995 | Kim . |
| 5,465,366 | 11/1995 | Heineman ............. 713/324 |
| 5,579,252 | 11/1996 | Huang . |
| 5,579,524 | 11/1996 | Kikinis . |
| 5,590,340 | 12/1996 | Morita et al. . |
| 5,598,565 | 1/1997 | Reinhardt . |
| 5,642,185 | 6/1997 | Altrieth, III . |
| 5,657,257 | 8/1997 | Lee . |
| 5,664,203 | 9/1997 | Hong et al. ............ 713/323 |
| 5,670,832 | 9/1997 | Takeda . |
| 5,680,535 | 10/1997 | Harbin et al. . |
| 5,684,998 | 11/1997 | Enoki et al. ........... 713/323 |
| 5,708,819 | 1/1998 | Dunnihoo . |
| 5,768,602 | 6/1998 | Dhuey .................. 713/322 |
| 5,799,198 | 9/1998 | Fung .................... 713/323 |

*Primary Examiner*—Glenn A. Auve
*Attorney, Agent, or Firm*—Robert E. Bushnell, Esq.

[57] ABSTRACT

This invention relates to a computer system having a screen saver with a power shutdown function and the control method thereof, comprising a timer for measuring time, an input device for inputting, and a controller for automatically terminating an operating system program when there has been no input signal from an input device for a predetermined time while a screen saver is operating. The computer system having a screen saver with a power shutdown function terminates all programs and the operating system program, such as Microsoft Windows, and then shuts down the power to a computer if there has been no input for a predetermined time while the screen saver is operating under the operating system program.

25 Claims, 2 Drawing Sheets

COMPUTER SYSTEM HAVING A SCREEN SAVER WITH A POWER SHUTDOWN FUNCTION AND A CONTROL METHOD THEREOF

CLAIM OF PRIORITY

This application makes reference to, incorporates the same herein, and claims all benefits accruing under 35 U.S.C. §119 from an application entitled A COMPUTER SYSTEM HAVING A SCREEN SAVER WITH A POWER SHUTDOWN FUNCTION AND A CONTROL METHOD THEREOF earlier filed in the Korean Industrial Property Office on the 18th day of April 1997, and there duly assigned Ser. No. 97-14559 by that Office.

BACKGROUND OF THE INVENTION

1. Technical Field

The present invention relates to a computer system having a screen saver with a power shutdown function and a control method thereof. More particularly, the present invention relates to a computer system having a screen saver with a power shutdown function which terminates all programs and the operating system program, and then shuts down the power to the computer system if there has been no input for a predetermined time while the screen saver is operating under an operating system program.

2. Related Art

With the increased use of computers, there has been a surge in new development of hardware and software designed to conserve energy. One method used to conserve energy in computers is to cause the computer to enter a sleep mode during periods when the computer is not being used. A sleep mode can be a mode where a computer consumes less energy than when it is in its normal operating state.

Sometimes a screen saver program is operated when a computer is not being used. A screen saver program can be used to reduce display degradation that occurs when an image remains on a cathode ray tube (CRT) for an extended period of time. Conventionally, a screen saver mode is initiated when a computer is idle (not used) for a predetermined time. When the screen saver mode is initiated, information displayed on a computer monitor is blanked out or replaced by other images. Once a screen saver mode is initiated, the screen saver mode remains active until an operator inputs information using a keyboard or mouse. While the screen saver mode is active, if an operator inputs information using a keyboard or mouse the screen saver mode will be thereby terminated. When the screen saver mode is terminated, the information which was replaced by other images is again displayed on the computer monitor. A problem with screen savers is as follows. When there is no operator input for an extended period of time, the screen saver program continues to operate and power is thereby wasted.

Examples of screen savers are disclosed in U.S. Pat. No. 5,680,535 for Screen Saver for Exhibiting Artists and Artwords issued to Harbin et al. and U.S. Pat. No. 5,642,185 for Automatic Termination of Screen Saver Mode on a Display of Reproduction Apparatus issued to Altrieth III et al.

Examples of methods and devices used to conserve energy are disclosed in U.S. Pat. No. 5,708,819 for Process and Apparatus for Generating Power Management Events in a Computer System issued to Dunnihoo, U.S. Pat. No. 5,670,832 for Power-Supply Control Apparatus for Image Processing Apparatus issued to Takeda, U.S. Pat. No. 5,657, 257 for Power-Supply Controller of Computer issued to Lee, U.S. Pat. No. 5,598,565 for Method and Apparatus for Screen Power Saving issued to Reinhardt, U.S. Pat. No. 5,579,524 for Optimized Power Supply System for Computer Equipment issued to Kikinis, U.S. Pat. No. 5,579,252 for Computer Monitor Power-Saving Device issued to Huang, U.S. Pat. No. 5,457,516 for Energy Saving Image-Forming Apparatus and Control Method Therefor issued to Kim, U.S. Pat. No. 5,371,693 for Computer with Power Saving Function issued to Nakazoe, and U.S. Pat. No. 5,059,961 for Screen Blanker for a Monitor of a Computer System issued to Cheng.

Pertaining to a computer power off-power on cycle, a method for suspending/resuming software applications on a computer is disclosed in U.S. Pat. No. 5,590,340 for Apparatus and Method for Suspending and Resuming Software Application on a Computer issued to Morita et al.

Although presently there do exist screen savers lengthening the life of computer monitors, and although presently there do exist systems with energy conserving features, I have discovered that it would be desirable to develop an enhanced energy conserving feature to further reduce the energy that is consumed unnecessarily.

SUMMARY OF THE INVENTION

It is an object of the present invention to provide a computer system having a screen saver with a power shutdown function for saving power, by terminating the operating system program and then shutting down the power to the computer system, if there has been no input signal from the input device for a predetermined time while the screen saver is operating, in order to substantially overcome the limitation and disadvantage of the related art.

It is another object of the present invention to provide solutions to the problems of the related art, including a solution to the problem of energy being wasted during the operation of a screen saver.

To achieve the above objects, as embodied and broadly described herein, the present invention comprises a timer for measuring time, an input device for inputting, and a controller for automatically terminating an operating system program if there has been no input signal from the input device for a predetermined time while the screen saver is operating.

Furthermore, to achieve the above objects, the present invention comprises the following steps. Determining whether the screen saver is in operation, checking whether there is an input signal from the input device for a predetermined time after operating the timer, terminating all programs and the operating system program if there is no input signal for a predetermined time, and then terminating power to the computer system.

The present invention is more specifically described in the following paragraphs by preference to the drawings attached only by way of example.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

Figure 1:
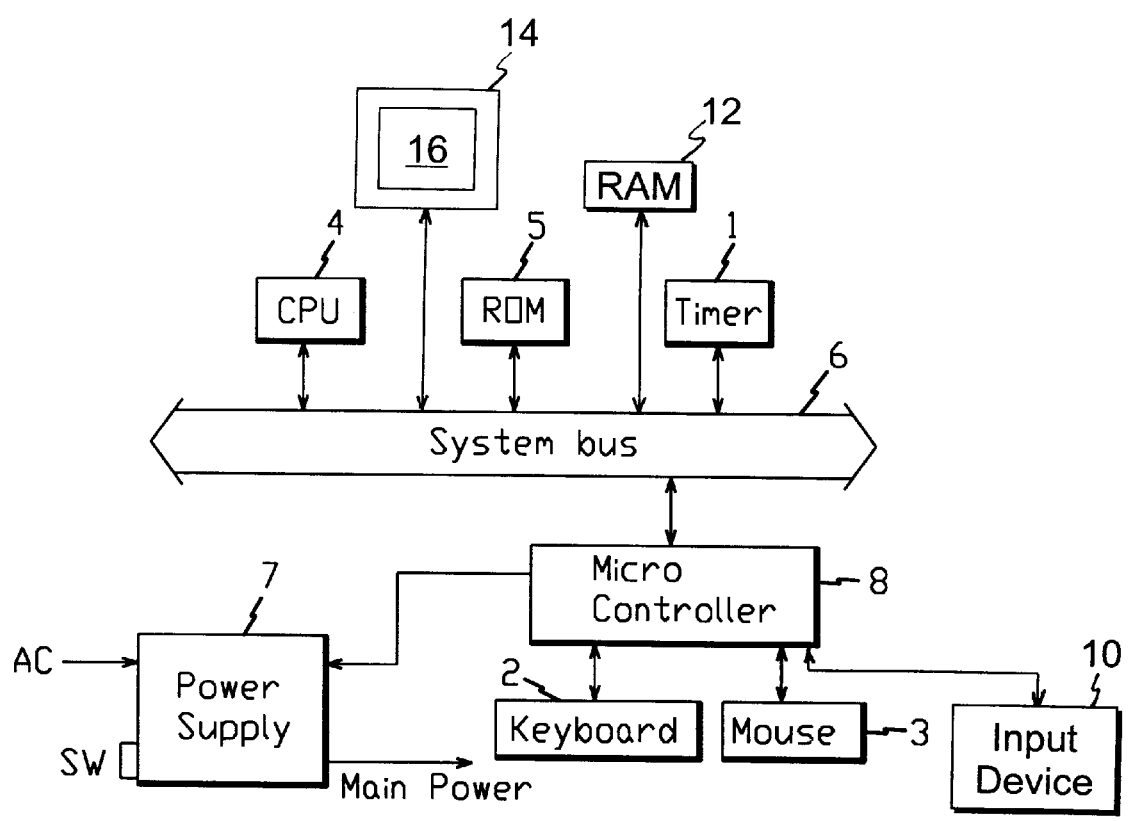
FIG. 1 is a block diagram illustrating a computer system having a screen saver with a power shutdown function, according to the principles of the present invention.

Refer now to FIG. 1, which is a block diagram illustrating a computer system having a screen saver with a power shutdown function, according to the principles of the present invention. The computer system of FIG. 1 comprises a power supply 7 which receives alternating current (AC) power from an external source. The power supply 7 supplies power to components of the computer system and has a power switch SW. The power switch SW can be operated to turn on and turn off the computer system. A timer 1 measures time.

A keyboard 2, mouse 3, and input device 10 can be used by an operator to input information to a central processing unit 4 (CPU). The input device 10 can be an eyetracker control device, joystick, light pen, trackball, or other peripheral used to input information to the central processing unit 4. Also, the input device 10 can be a peripheral capable of inputting an interrupt request command to the central processing unit 4, such as a floppy disk drive, a compact disc (CD) drive, or a digital versatile disc (DVD) drive. An interrupt request command would be input to the central processing unit 4 when, for example, a floppy disk is inserted into the floppy disk drive. An interrupt request command would also be input to the central processing unit 4 when a compact disc is inserted into the compact disc drive, or a digital versatile disc is inserted into the digital versatile disc drive.

In FIG. 1, the central processing unit 4 outputs a control signal which shuts off the power supplied by the power supply 7 when there has been no input signal for a predetermined time while a screen saver program is operating. The keyboard 2, mouse 3, and input device 10 are the devices which input signals to the central processing unit 4. A micro controller 8 transfers input signals received from the keyboard 2, mouse 3, and input device 10 to the central processing unit 4 through a system bus 6. In addition, the micro controller 8 controls the keyboard 2, mouse 3, input device 10, and power supply 7, according to a control signal from the central processing unit 4. A computer monitor 14 includes a screen 16. The monitor 14 includes support circuitry. The screen 16 can be a cathode ray tube (CRT), a liquid crystal display, or other type of screen used with a computer system.

A read only memory (ROM) 5 contains a stored control program. A random access memory (RAM) 12 stores a screen saver program, an operating system program, and instructions pertaining to the method of the present invention. More specifically, the random access memory 12 stores instructions regarding the screen saver program, the operating system program, the control of the timer 1, the termination of the operating system program, the termination of the supply of the power to the computer system, and a suspend mode of the computer system. The operating system program controls the operations of components of the computer system. A system bus 6 is connected to the central processing unit 4, the read only memory 5, the timer 1, the random access memory 12, the monitor 14, and the micro controller 8.

Figure 2:
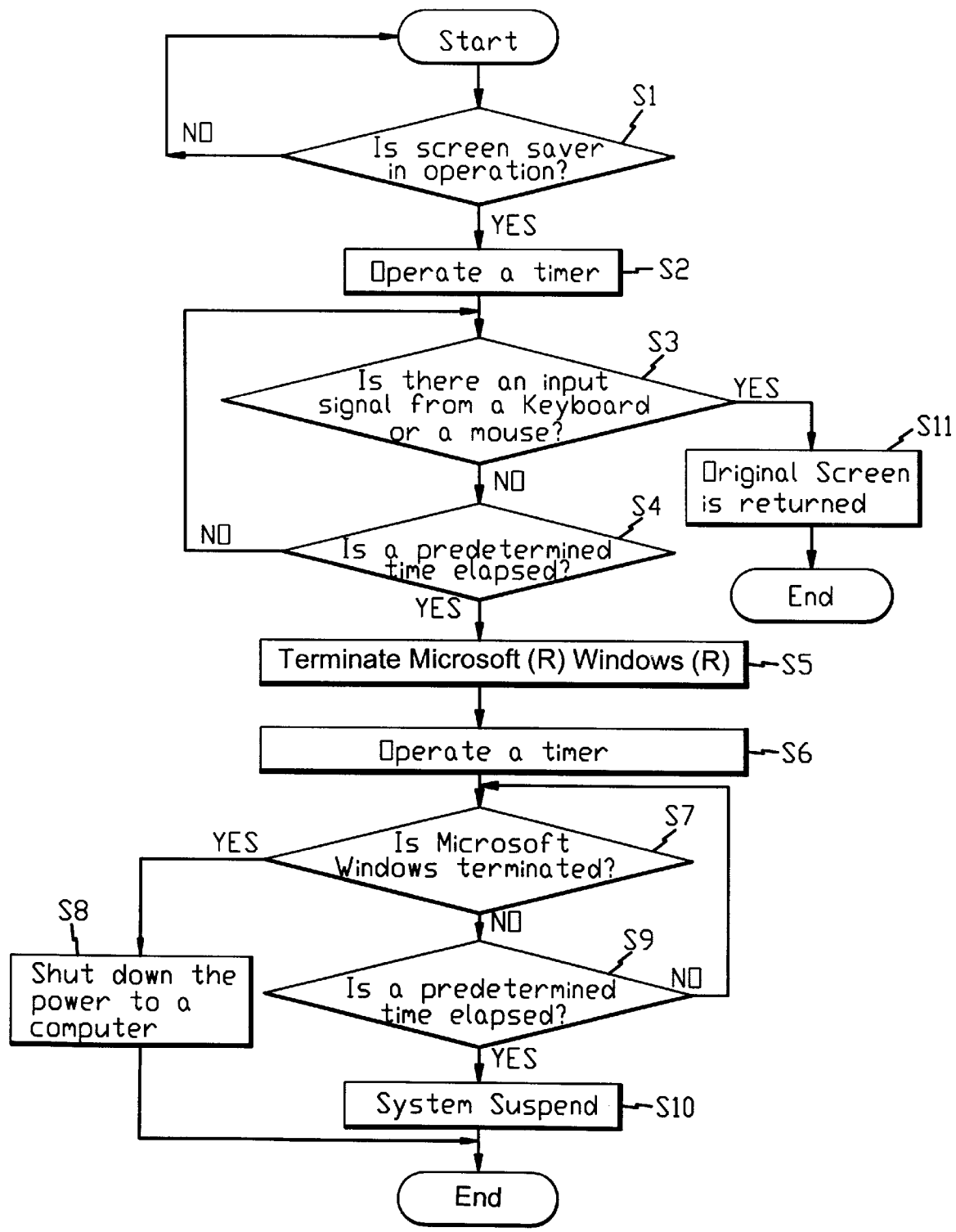
FIG. 2 is a flowchart illustrating the control method of a computer system having a screen saver with a power shutdown function, according to the principles of the present invention.

Refer now to FIG. 2, which is a flowchart illustrating the control method of a computer system having a screen saver with a power shutdown function, according to the principles of the present invention. After power is supplied to the computer system of FIG. 1 having a screen saver program with a power shutdown function, a user operates the computer system. After the operation of the computer system has begun, if there is no input signal for a first predetermined time period from the keyboard 2, mouse 3, or input device 10, then the operation of a screen saver program begins. The first time period is preferably a time period of seven minutes.

In FIG. 2, at step S1, the central processing unit 4 determines whether the screen saver program is in operation. At step S2, if the screen saver program is in operation, the central processing unit 4 operates the timer 1. Then, at step S3, the central processing unit 4 senses whether there is an input signal received from the keyboard 2, mouse 3, or other input device 10.

At step S4, if no input signal is received, the central processing unit 4 checks whether a second predetermined time period has elapsed, preferably a time period of five minutes. At step S5, if there is no input signal for the duration of the second predetermined time period, the central processing unit 4 terminates the operating system program. In this embodiment, the operating system program is a Microsoft(R) Windows(R) operating system program. At step S11, if there is an input signal from the keyboard 2, mouse 3, or other input device 10, the original screen is returned so that the user can resume work on the computer system.

Next, at step S6, the central processing unit 4 operates the timer 1 again. At step S7, the central processing unit 4 senses whether the Microsoft Windows operating system program has been terminated. At step S8, if Microsoft Windows has been terminated, the central processing unit 4 shuts down the main power of the power supply 7 by controlling the micro controller 8.

Note that Microsoft Windows will not be terminated at the above—referenced step S5 under certain conditions. For example, Microsoft Windows will not be terminated if a data file has not been saved or an application program is being executed under a DOS operation. If Microsoft Windows has not been terminated, then step S9 is performed. At step S9, a test is made to check if a third predetermined time period has elapsed, preferably a time period of two minutes. If the third predetermined time period has not yet elapsed, then step S7 is performed again. Alternatively, if the third predetermined time period has already elapsed, then step S10 is performed. At step S10, since Microsoft Windows has not yet been terminated and the third predetermined time period has already elapsed, the computer system is put into a suspend mode state and the amount of power supplied from power supply 7 is modified. When the computer system is put into the suspend mode state, the contents of the operating data are stored in random access memory 12 to thereby enable data reconstruction upon resumption of full power. In the suspend mode state, the power supplied from power supply 7 to the computer system is either is shut off completely or merely reduced.

Consequently, as described above, the effect of the present invention is that power consumption is reduced by terminating Microsoft Windows and shutting down the power to the computer system when there has been no input for a predetermined time while the screen saver program is operating under Microsoft Windows.

In the embodiment described above, a Microsoft(R) Windows(R) operating system program is discussed. The Microsoft Windows operating system program discussed above can be Microsoft Windows 3.1, Microsoft Windows 95, Microsoft Windows NT, or other Microsoft Windows versions. In addition, the present invention can be effective in conjunction with operating system programs other than Microsoft Windows. For example, the principles of the present invention can be applied to a computer system using a version of a UNIX operating system program, a version of DOS (disk operating system), or other operating system programs.

The principles of the present invention can be used with any type of computer monitor, including cathode ray tube units, liquid crystal display units, and others.

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the central scope thereof Therefore, it is intended that the present invention not be limited to the particular embodiment disclosed as the best mode contemplated for carrying out the present invention, but that the present invention includes all embodiments falling within the scope of the appended claims.

What is claimed is:

1. A computer apparatus having a screen saver program and a power shutdown function, comprising:
    a video display conveying varying visual information to a user;
    a timer measuring time;
    an input unit inputting signals; and
    a control unit connected to said video display, said timer, and said input unit, receiving said signals from said input unit, controlling an operating system program and a screen saver program reducing degradation in said video display, starting the screen saver program when said signals are not received before a first quantity of time elapses, terminating the screen saver program when said signals are received after the starting of the screen saver program and before a second quantity of time elapses;
    when a predetermined condition is not detected and said signals are not received after the starting of the screen saver program and said signals are not received before the second quantity of time elapses, said control unit automatically terminating the operating system program;
    said control unit controlling a suspend program storing operating data, reducing power supplied to the computer apparatus, and enabling reconstruction of the operating data upon resumption of full power being supplied to the computer apparatus;
    when said predetermined condition is detected and said signals are not received after the screen saver program is started and said signals are not received before the second quantity of time elapses and a third quantity of time elapses after the second quantity of time elapses and the operating system program is not terminated, said control unit starting the suspend program.

2. The computer apparatus of claim 1, further comprising:
    a power supply supplying power to said video display, timer, input unit, and control unit;
    said power supply cutting off power to said video display, timer, input unit, and control unit when the operating system program is terminated.

3. The computer apparatus of claim 1, further comprising said control unit controlling a suspend program storing operating data, reducing power supplied to the computer apparatus, and enabling reconstruction of the operating data upon resumption of full power being supplied to the computer apparatus.

4. The computer apparatus of claim 3, further comprising:
    when said predetermined condition is detected and said signals are not received after the screen saver program is started and said signals are not received before the second quantity of time elapses and a third quantity of time elapses after the second quantity of time elapses and the operating system program is not terminated, said control unit starting the suspend program.

5. The computer apparatus of claim 1, said reducing of power supplied to the computer apparatus corresponding to a cutting off of power supplied to the computer apparatus.

6. The computer apparatus of claim 5, further comprising:
    when said predetermined condition is detected and said signals are not received after the screen saver program is started and said signals are not received before the second quantity of time elapses and a third quantity of time elapses after the second quantity of time elapses and the operating system program is not terminated, said control unit starting the suspend program.

7. The apparatus of claim 5, further comprising said predetermined condition corresponding to a data file being not saved.

8. The computer apparatus of claim 1, further comprising said input unit corresponding to a peripheral device selected from the group consisting of a keyboard, a mouse, a trackball, and a joystick.

9. The computer apparatus of claim 1, further comprising said input unit corresponding to a peripheral device selected from the group consisting of a floppy disk drive, a compact disc drive, and a digital versatile disc drive.

10. The apparatus of claim 1, further comprising said predetermined condition corresponding to a data file being not saved.

11. A method of controlling a computer apparatus having a screen saver program and a power shutdown function, comprising the steps of:
    sensing whether a screen saver program is started;
    when the screen saver program is started, operating a timer measuring time;
    sensing whether a signal is received from an input unit before a first quantity of time elapses, the first quantity of time being measured by said timer;
    when a predetermined condition is not detected and said signal is not received before the first quantity of time elapses, automatically terminating an operating system program of the computer apparatus;
    controlling a suspend pro gram storing operating data, reducing power supplied to the computer apparatus, and enabling reconstruction of the operating data upon resumption of full power being supplied to the computer apparatus; and
    when said predetermined condition is detected and said signal is not received before the first quantity of time elapses and a second quantity of time elapses after the first quantity of time elapses and the operating system program of the computer apparatus is not terminated, starting the suspend program.

12. The method of claim 11, further comprising the step of shutting off power to the computer apparatus when the operating system program of the computer apparatus is automatically terminated.

13. The method of claim 11, further comprising the steps of:

controlling a suspend program storing operating data, reducing power supplied to the computer apparatus, and enabling reconstruction of the operating data upon resumption of full power being supplied to the computer apparatus; and when said predetermined condition is detected and said signal is not received before the first quantity of time elapses and a second quantity of time elapses after the first quantity of time elapses and the operating system program of the computer apparatus is not terminated, starting the suspend program.

14. The method of claim 11, said reducing of power supplied to the computer apparatus corresponding to a shutting off of power supplied to the computer apparatus.

15. The method of claim 14, further comprising said predetermined condition corresponding to a data file being not saved.

16. The method of claim 11, further comprising said input unit corresponding to a peripheral device selected from the group consisting of a keyboard, a mouse, a trackball, and a joystick.

17. The method of claim 11, further comprising said input unit corresponding to a peripheral device selected from the group consisting of a floppy disk drive, a compact disc drive, and a digital versatile disc drive.

18. The method of claim 11, further comprising said predetermined condition corresponding to a data file being not saved.

19. A computer apparatus having a screen saver program and a power shutdown function, comprising:

a video display conveying varying visual information to a user;

a memory unit storing a screen saver program reducing degradation in said video display, and storing an operating system program;

a timer measuring time;

an input unit inputting signals; and a central processing unit connected to said video display, said memory unit, said timer, and said input unit, operating said timer, sensing whether said signals are received from said input unit, controlling the operating system program and the screen saver program, starting the screen saver program when said signals are not received before a first quantity of time elapses, terminating the screen saver program when said signals are received after the starting of the screen saver program and before a second quantity of time elapses; and a control unit connected to said central processing unit;

when a predetermined condition is not detected and said signals are not received after the starting of the screen saver program and said signals are not received before the second quantity of time elapses, said control unit automatically terminating the operating system program according to said central processing unit.

20. The computer apparatus of claim 19, further comprising:

a power supply supplying power to said video display, timer, memory unit, input unit, central processing unit and control unit;

said power supply cutting off power to said video display, timer, memory unit, input unit, central processing unit and control unit when the operating system program is terminated.

21. The computer apparatus of claim 19, further comprising said central processing unit controlling a suspend program storing operating data, reducing power supplied to the computer apparatus, and enabling reconstruction of the operating data upon resumption of full power being supplied to the computer apparatus.

22. The computer apparatus of claim 21, further comprising:

when said predetermined condition is detected and said signals are not received after the screen saver program is started and said signals are not received before the second quantity of time elapses and a third quantity of time elapses after the second quantity of time elapses and the operating system program is not terminated, said central processing unit starting the suspend program.

23. The apparatus of claim 22, further comprising said predetermined condition corresponding to a data file being not saved.

24. The computer apparatus of claim 19, further comprising said central processing unit controlling a suspend program storing operating data, cutting off power supplied to the computer apparatus, and enabling reconstruction of the operating data upon resumption of power being supplied to the computer apparatus.

25. The computer apparatus of claim 19, further comprising said input unit corresponding to a peripheral device selected from the group consisting of a keyboard, a mouse, a trackball, a joystick, a floppy disk drive, a compact disc drive, and a digital versatile disc drive.

* * * * *